2,943,105
TREATMENT OF HYDROCARBON SOLUTIONS OF OXYGENATED CHEMICALS WITH SOLID ADSORBENTS

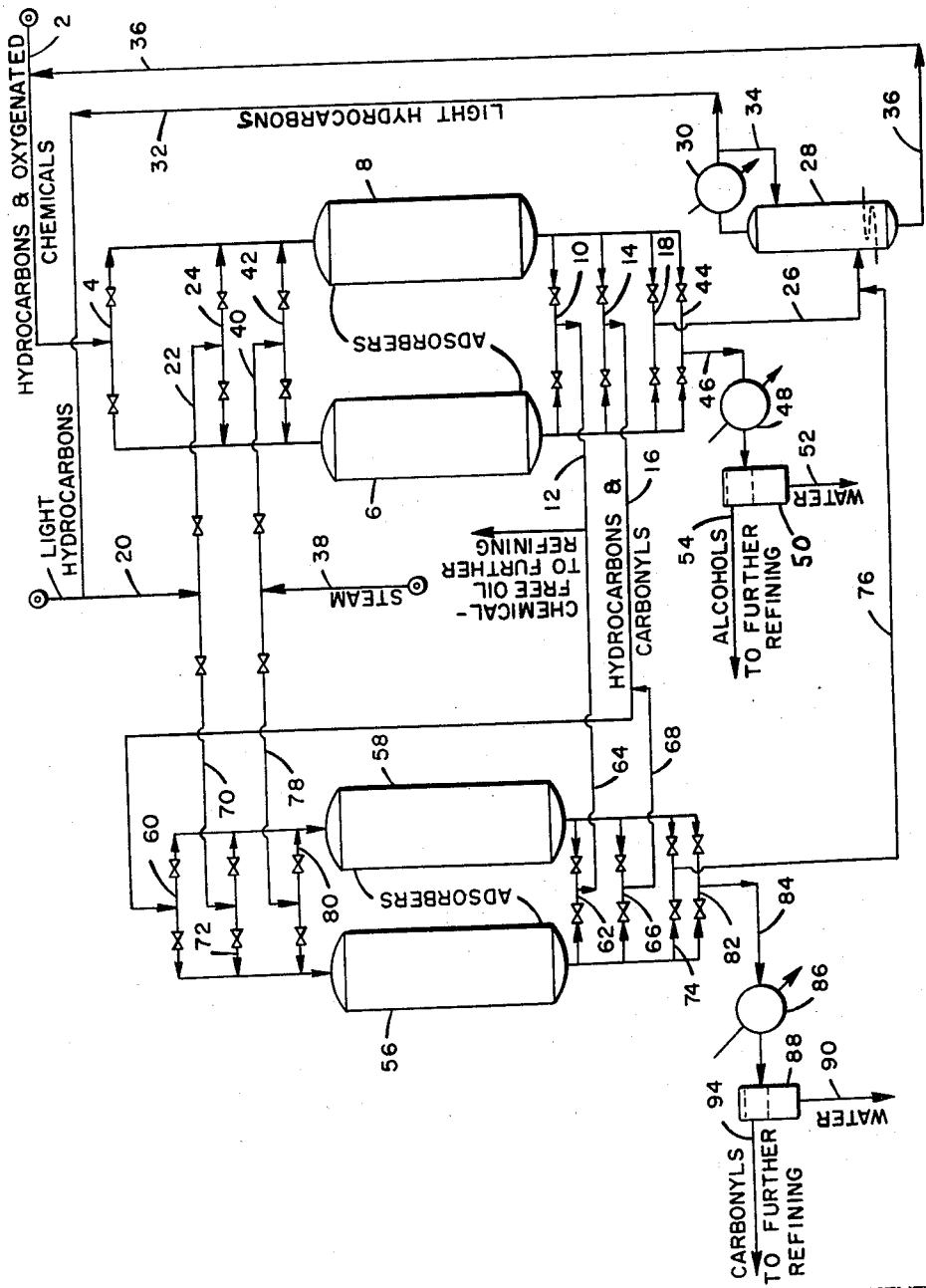

Neal M. Caruthers, Tulsa, Okla., assignor to Pan American Petroleum Corporation, Tulsa, Okla., a corporation of Delaware Filed Dec. 23, 1957, Ser. No. 704,624

2 Claims. (Cl. 260—450)

The present invention relates to a novel method for recovery of oxygenated organic chemicals from hydrocarbon solutions thereof. More particularly it is concerned with the separation of alcohols from carbonyl compounds dissolved in various hydrocarbon mixtures.

Briefly, one embodiment of this process is accomplished by percolating a hydrocarbon solution of alcohols and carbonyls through a bed of a suitable adsorbent until the latter is fully loaded with alcohols. Thereafter the resulting adsorbate is rinsed with a suitable solvent to remove non-adsorbed, high boiling material. Then, by application of heat, the alcohols are desorbed and recovered. Separation of carbonyls passing on through the bed with hydrocarbons can be accomplished in a second adsorbent bed in the same fashion as the alcohols were recovered.

While the principles taught herein find application in the recovery of oil-soluble chemicals from numerous crude hydrocarbon mixtures thereof, the present description deals primarily with a novel method for recovering valuable chemicals from oil product streams obtained by the hydrogenation of carbon monoxide in the presence of a fluidized alkali-promoted iron or equivalent catalyst under known synthesis conditions.

The separation of mixtures of the type contemplated herein is an extremely difficult technical problem which has been explored for a number of years by many investigators. Although some of the methods developed appear to have promising commercial possibilities, none of them has met with unqualified success. For example, all types of oxygenated organic compounds have been removed from hydrocarbon solutions by contacting the latter with an adsorbent solid, such as activated alumina, silica gel or the like, after which the oxygenated compounds are recovered from the adsorbent by steam distillation or by elution with a polar solvent (such as methanol) followed by displacement of the eluting agent by means of fixed gases or light hydrocarbon vapors. By these methods, however, the alcohols and carbonyl compounds were generally desorbed together from the adsorbent bed. Such mixtures are quite complex and extremely difficult to separate the alcohols as a class from the carbonyls by means of fractionation methods.

Broadly, the process of my invention involves contacting a solid adsorbent material in an adsorption zone with a mixture of oxygenated organic compounds having varying degrees of polarity. These compounds may be dissolved in a solvent, preferably having little or no polarity. In any event, such solvent should have substantially less polarity than the compounds which it is desired to recover. When the mixture of said compounds is initially injected into a suitable adsorption bed, substantially all of the polar components thereof will be adsorbed. However, as the flow of this mixture through the bed continues, the more polar compounds in the introduced mixture tend to replace the less polar compounds which have been adsorbed. The effluent from the adsorption bed is periodically analyzed to determine whether or not the most polar component of the charge stock is beginning to appear therein. Until the appearance of the most polar compound in said effluent, the latter may be diverted to a second adsorption zone where, in similar manner, the most polar component of said effluent is separated. Flow of the mixture of polar compounds and solvent, if employed, through the first adsorption bed is continued until analysis of the effluent indicates that the most polar component of the feed to the adsorption bed is no longer being removed. This means that the adsorption bed is substantially saturated with the most polar compound of the original mixture. At this stage, the adsorbed compound or compounds are recovered from the adsorbent in the customary way, such as, for example, by steam. Depending upon the number of polar compounds in the original charge stock and the degree of separation of individual classes of compounds desired, the effluent from the second adsorption zone may be run through a third adsorption zone and so on to recover at each adsorption stage a substantially pure class of polar compounds as hereinafter described in further detail.

In carrying out one embodiment of my invention, a hydrocarbon solution of alcohols and carbonyls such as, for example, neutralized HCS oil, is percolated through a column of an adsorbent such as alumina. This step generally may take place at atmospheric pressure or super-atmospheric pressure and at temperatures, for example, of about 70° to 100° F. The first effluent from the column is substantially chemically free oil, both the carbonyls and alcohols being removed readily from the hydrocarbon solution. Continued introduction of feed stock into the column results in selective adsorption of additional alcohols and simultaneous displacement or desorption of carbonyls to yield an effluent richer in carbonyls than the feed. This effluent is taken to a second adsorption bed where the carbonyls are separated from the hydrocarbons. The adsorbed alcohols and carbonyl compounds are thereafter separately recovered by suitable desorption steps.

Adsorbents suitable for use in the process of my invention may be selected from a wide variety of materials. Typical examples of operable adsorbent materials are silica gel, activated alumina and the like.

The process of my invention my be further illustrated by the following example:

Example

Into an adsorption column, having a volume of approximately 375 ml., and containing 309 grams of activated alumina ranging in size from about 48 to about 100 mesh, 300 grams of neutral hydrocarbon synthesis oil was added at approximately 875 grams per hour. The chemical content of this oil was about 28 weight percent and consisted of substantially equal amounts of alcohols and carbonyl compounds. Adsorption was carried out at atmospheric pressure and at about room temperature, i.e., @ 70° F. Samples were periodically analyzed by means of infrared adsorption. The first 70 grams of oil collected at the base of the adsorption column were found to be free of oxygenated chemicals. In the same manner the next 93 grams of oil coming through were found to contain carbonyl compounds—20 grams or about 21 weight percent of the second cut consisted of carbonyl compounds. The balance of the oil coming through amounted to about 91 grams and contained about 18 grams of chemicals, i.e., alcohols and carbonyls. A light hydrocarbon such as pentane, was then introduced into the column to replace the heavier hydrocarbons from the void spaces in the adsorption bed. After this operation, air was conducted through the bed at room temperature over night to drive off the pentane. Alcohols were next desorbed from the alumina by the action of steam. The alcohols thus removed were collected and allowed to separate from the condensed steam, after which the product alcohols were separately recovered by fractionation. No attempt was made to recover alcohols dissolved in the water layer. The alcohols obtained in this manner amounted to about 13 grams or approximately 30 weight percent of the alcohols originally present in the feed and were found to contain not more than about 5 weight percent carbonyls. After treatment with steam in the manner described above, the adsorption bed was placed in condition for the next cycle.

In similar fashion, the carbonyls were separated from the above-mentioned second cut (93 grams) in an amount corresponding to about 75 to 80 percent of the carbonyls originally present in the feed.

The process of my invention is further illustrated by reference to the accompanying drawing in which, for example, neutral hydrocarbon synthesis oil is introduced through line 2 into manifolding equipment 4, downwardly through the adsorbers. A stream of substantially chemical free hydrocarbons emerges from adsorption column 6 through exit manifold 10 and line 12, and thereafter sent to further refining. Flow of charging stock from line 2 through one adsorption column or through one group of such columns, is continued until analysis of the effluent indicates that carbonyls are being desorbed and entering the effluent. At this stage the flow of effluent through exit manifold 10 is discontinued and diverted into exit manifold 14. This fraction contains hydrocarbons and principally carbonyls, some of which have been desorbed by the freshly added alcohols present in the charging stock. The stream flowing through line 16, then, contains a substantially higher percentage of carbonyls than was present in the original feed. Withdrawal or effluent in this manner is continued until the appearance of alcohols is detected. Thereafter flow of effluent is diverted to exit manifold 18 and a light hydrocarbon, such as pentane, introduced into the adsorption column via lines 20, 22 and inlet manifold 24. Flow of hydrocarbons and chemicals through line 2 is diverted into column 8 and the above cycle repeated.

The stream of light hydrocarbons and dissolved heavy hydrocarbons, together with some chemicals, is taken from exit manifold 18 through line 26 and fractionating tower 28 where light hydrocarbon fractions are brought overhead, cooled in condenser 30 and the bulk of the distillate taken through line 32 and returned to line 20. A portion of the distillate is returned to tower 28 through line 34 as reflux. The bottoms containing heavier hydrocarbons and some chemicals is removed from tower 28 through line 36 and returned to line 2 to be recycled through the adsorption system.

When the light hydrocarbon rinsing step in column 6 is discontinued, steam is introduced via lines 38 and 40 and injection manifold 42. The resulting effluent is taken off through exit manifold 44 and line 46. This stream consists essentially of alcohols, steam and hydrocarbon vapors, principally pentane vapors. Elution of alcohols from the adsorbent may, of course, be accomplished without the addition of steam such as, for example, by the use of a light hydrocarbon such as butane, at temperatures of from about 200° to 325° F. This not only removes the alcohols but at the same time places the adsorption bed in condition for the succeeding adsorption cycle. In a like manner, the adsorbent bed in column 8 may be regenerated.

The steam in line 46 is then run through chiller 48 in order to liquify the components thereof, possibly with the exception of some of the lighter hydrocarbons. The resulting cooled steam is next transferred to separator 50 and allowed to stratify into an upper organic layer and a lower aqueous layer. The latter is removed through line 52 and may, if desired, be carefully fractionated to recover any dissolved alcohols. The organic layer consisting chiefly of alcohols, is taken off through line 54 and sent to further refining, if necessary, to remove any dissolved hydrocarbons that might be present.

The stream of hydrocarbons and carbonyl compounds in line 16, previously referred to, is transferred to a second adsorption system represented by adsorbers 56 and 58. This stream in line 16 is introduced into manifolding equipment 60 and forced downwardly through, for example, adsorber 56, which may represent a single adsorption column or a group of such columns. The effluent thus obtained, which consists essentially of chemical free hydrocarbons, is withdrawn through exit manifold 62, emptied into line 64 and eventually combined with the chemical free oil in line 12. When the effluent from column 56 shows the presence of carbonyl compounds, as determined, for example, by infrared analysis, the stream is diverted from exit manifold 62 to exit manifold 66 from which it is transferred via line 68 to line 16 and recycled to the adsorption system.

At this stage, further introduction of feed through line 12 into column 56 is discontinued and this stream is diverted into column 58 where the procedural steps already performed in column 56 are repeated. Simultaneously, a hydrocarbon rinse stream is sent to column 56 via lines 20 and 70 and inlet manifold 72 where heavy hydrocarbons are removed from the surface of and the spaces between the finely divided adsorbent material. The resulting effluent is directed to exit manifold 74 and sent through line 76 to be combined with the contents of line 26 which feeds fractionating tower 28 and the components of this stream (line 76) are separated as previously described.

The adsorbent in column 56 is then regenerated by injection of steam through lines 38, 78 and injection manifold 80, yielding an effluent comprising essentially carbonyls, steam and light hydrocarbon vapors. This effluent is taken off through exit manifold 82 and sent through line 84 to chiller 86 where substantially all of the components of the steam are liquified. This condensate is then transferred to separator 88 and allowed to stratify into an upper organic layer and a lower aqueous layer. The latter is withdrawn through line 90 and taken to further refining, if desired, to recover any carbonyl compounds dissolved therein. A stream consisting essentially of carbonyl compounds is withdrawn from separator 88 through line 94 and likewise sent to further refining, where hydrocarbon contaminants, if present, may be removed.

The steps of carbonyl compound separation from the hydrocarbon feed of adsorber 58, the recycling of a carbonyl containing hydrocarbon streams to the adsorption system via line 16, the light hydrocarbon rinsing process involved by steam regeneration of the adsorbent bed, are all carried out with respect to column 58 in the same manner as described in detail in connection with column 56.

It will be appreciated from the foregoing description, that the process of my invention is applicable to a treatment of a wide variety of hydrocarbon solutions containing oxygenated chemicals wherein it is desired to recover classes of compounds, such as alcohols and carbonyls, in separate streams. Actually the process of my invention may be used in separating into individual classes other polar compounds in addition to alcohols and carbonyls, or in place of either alcohols or carbonyls. In a continuous process involving my invention, the number of separate adsorption systems would correspond to the number of different classes of polar compounds which it is desired to separate.

I claim:

1. In a process for separately recovering from a neutral solution of hydrocarbon synthesis oil, alcohols and carbonyl compounds normally occurring in said oil, the improvement which comprises contacting a solid adsorbent material selective for said alcohols and carbonyl compounds in an adsorption zone with said solution under conditions such that initially said adsorbent becomes saturated with respect to said alcohols and carbonyls, thereafter flowing said solution through said zone whereby the alcohols present in said solution serve to desorb carbonyls from said adsorbent, continuing the flow of said solution through said zone until analysis of the effluent therefrom begins to show the presence of the alcohols originally present in said solution, thereby indicating that said adsorbent is saturated with respect to said alcohols, discontinuing flow of said solution through said zone and desorbing said alcohols from said adsorbent.

2. The process of claim 1 in which the solid adsorbent material is activated alumina.

References Cited in the file of this patent

UNITED STATES PATENTS

| | | |
|---|---|---|
| 2,529,624 | Murray | Nov. 14, 1950 |
| 2,542,521 | Hibshman et al. | Feb. 20, 1951 |
| 2,621,203 | Cope | Dec. 9, 1952 |
| 2,646,171 | Weiss | July 21, 1953 |
| 2,653,960 | Hess et al. | Sept. 29, 1953 |
| 2,760,993 | Chang | Aug. 28, 1956 |